United States Patent
Ishii et al.

(10) Patent No.: US 11,687,343 B2
(45) Date of Patent: Jun. 27, 2023

(54) DATA PROCESSING APPARATUS AND METHOD FOR PROVIDING CANDIDATE PREDICTION ENTRIES

(71) Applicant: Arm Limited, Cambridge (GB)

(72) Inventors: Yasuo Ishii, Austin, TX (US); Chang Joo Lee, Austin, TX (US); James David Dundas, Austin, TX (US); Muhammed Umar Farooq, Austin, TX (US)

(73) Assignee: Arm Limited, Cambridge (GB)

( * ) Notice: Subject to any disclaimer, the term of this patent is extended or adjusted under 35 U.S.C. 154(b) by 78 days.

(21) Appl. No.: 17/036,442

(22) Filed: Sep. 29, 2020

(65) Prior Publication Data
US 2022/0100666 A1    Mar. 31, 2022

(51) Int. Cl.
*G06F 9/38*    (2018.01)

(52) U.S. Cl.
CPC .......... *G06F 9/3806* (2013.01); *G06F 9/3867* (2013.01); *G06F 9/3844* (2013.01); *G06F 9/3861* (2013.01)

(58) Field of Classification Search
CPC ..... G06F 9/3806; G06F 9/3867; G06F 9/3861
See application file for complete search history.

(56) References Cited

U.S. PATENT DOCUMENTS

| 5,935,241 | A * | 8/1999 | Shiell | G06F 9/3806 712/240 |
| 2004/0015683 | A1* | 1/2004 | Emma | G06F 9/3806 712/240 |
| 2009/0049286 | A1* | 2/2009 | Levitan | G06F 9/3804 712/237 |
| 2013/0238858 | A1* | 9/2013 | Greenhalgh | G06F 9/3814 711/E12.017 |

(Continued)

OTHER PUBLICATIONS

Adiga et al., "The IBM z15 High Frequency Mainframe Branch Predictor", 2020 ACM/IEEE 47th Annual International Symposium on Computer Architecture (ISCA), May 30-Jun. 3, 2020, pp. 27-39.

(Continued)

*Primary Examiner* — Courtney P Carmichael-Moody
(74) *Attorney, Agent, or Firm* — Nixon & Vanderhye P.C.

(57) ABSTRACT

A data processing apparatus and a method are disclosed. The data processing apparatus comprising: a prediction cache to store a plurality of prediction entries, each defining an association between a prediction cache lookup address and a predicted behaviour; prediction circuitry to select a prediction entry based on a prediction cache lookup of the prediction cache based on a given prediction cache lookup address and to determine the predicted behaviour associated with the given prediction cache lookup address based on the selected prediction entry; and a candidate prediction buffer to store a plurality of candidate predictions each indicative of a candidate prediction entry to be selected for inclusion in a subsequent prediction cache lookup, wherein the candidate (Continued)

prediction entry is selected in response to a candidate prediction lookup based on a candidate lookup address different to a candidate prediction cache lookup address indicated as associated with a candidate predicted behaviour in the candidate prediction entry.

20 Claims, 10 Drawing Sheets

(56) References Cited

U.S. PATENT DOCUMENTS

| | | | |
|---|---|---|---|
| 2013/0339694 A1* | 12/2013 | Bonanno | G06F 9/3806 |
| | | | 712/238 |
| 2015/0268961 A1* | 9/2015 | Zuraski | G06F 9/3806 |
| | | | 712/207 |
| 2017/0068539 A1* | 3/2017 | Dundas | G06F 9/3806 |
| 2017/0139717 A1* | 5/2017 | Hornung | G06F 9/30058 |
| 2020/0174796 A1* | 6/2020 | Swanson | G06F 9/3867 |
| 2021/0004233 A1* | 1/2021 | Kumar | G06F 9/3857 |
| 2021/0318882 A1* | 10/2021 | Gong | G06F 9/3802 |

OTHER PUBLICATIONS

Bonanno et al., "Two Level Bulk Preload Branch Prediction", IEEE, Feb. 2013, pp. 1-12.

* cited by examiner

DATA PROCESSING APPARATUS AND METHOD FOR PROVIDING CANDIDATE PREDICTION ENTRIES

TECHNICAL FIELD

The present technique relates to data processing. More particularly the present invention relates to a prediction cache.

TECHNICAL BACKGROUND

Some data processing apparatuses may support prediction in which prediction circuitry is provided to select a prediction entry defining an association between a prediction cache lookup address and a predicted behaviour. Such prediction entries may be stored in a prediction cache. Realising high bandwidth in prediction circuitry requires a trade-off between the size and speed of the prediction cache. A smaller prediction cache can reduce latency associated with predictions. However, smaller prediction caches inherently store fewer entries than a larger prediction cache and, as a result, a lookup in a smaller prediction cache is more likely to miss resulting in a reduced lower overall hit rate of the prediction cache and a reduction in the overall throughput. Whilst a hierarchical prediction cache structure can be provided, such that a miss in the smaller prediction cache triggers a lookup in a main prediction cache, this process generally takes a number of clock cycles to complete.

SUMMARY

In some example embodiments described herein there is a data processing apparatus comprising: a prediction cache to store a plurality of prediction entries, each of the plurality of prediction entries defining an association between a prediction cache lookup address and a predicted behaviour; prediction circuitry to select a prediction entry based on a prediction cache lookup of the prediction cache based on a given prediction cache lookup address and to determine the predicted behaviour associated with the given prediction cache lookup address based on the selected prediction entry; and a candidate prediction buffer to store a plurality of candidate predictions, each of the plurality of candidate predictions indicative of a candidate prediction entry to be selected for inclusion in a subsequent prediction cache lookup, wherein the candidate prediction entry is selected in response to a candidate prediction lookup in the candidate prediction buffer based on a candidate lookup address different to a candidate prediction cache lookup address indicated as associated with a candidate predicted behaviour in the candidate prediction entry.

In some example embodiments described herein there is a method comprising: storing a plurality of prediction entries in a prediction cache, each of the plurality of prediction entries defining an association between a prediction cache lookup address and a predicted behaviour; selecting a prediction entry based on a prediction cache lookup of the prediction cache based on a given prediction cache lookup address; determining the predicted behaviour associated with the given prediction cache lookup address based on the selected prediction entry; and storing a plurality of candidate predictions, each of the plurality of candidate predictions indicative of a candidate prediction entry to be selected for inclusion in a subsequent prediction cache lookup, wherein the candidate prediction entry is selected in response to a candidate prediction lookup in the candidate prediction buffer based on a candidate lookup address different to a candidate prediction cache lookup address indicated as associated with a candidate predicted behaviour in the candidate prediction entry.

In some example embodiments described herein there is a data processing apparatus comprising: means for storing a plurality of prediction entries in a prediction cache, each of the plurality of prediction entries defining an association between a prediction cache lookup address and a predicted behaviour; means for selecting a prediction entry based on a prediction cache lookup of the prediction cache based on a given prediction cache lookup address; means for determining the predicted behaviour associated with the given prediction cache lookup address based on the selected prediction entry; and means for storing a plurality of candidate predictions, each of the plurality of candidate predictions indicative of a candidate prediction entry to be selected for inclusion in a subsequent prediction cache lookup, wherein the candidate prediction entry is selected in response to a candidate prediction lookup in the candidate prediction buffer based on a candidate lookup address different to a candidate prediction cache lookup address indicated as associated with a candidate predicted behaviour in the candidate prediction entry.

BRIEF DESCRIPTION OF THE DRAWINGS

The present technique will be described further, by way of example only, with reference to embodiments thereof as illustrated in the accompanying drawings, in which.

DESCRIPTION OF EXAMPLE EMBODIMENTS

Figure 1:
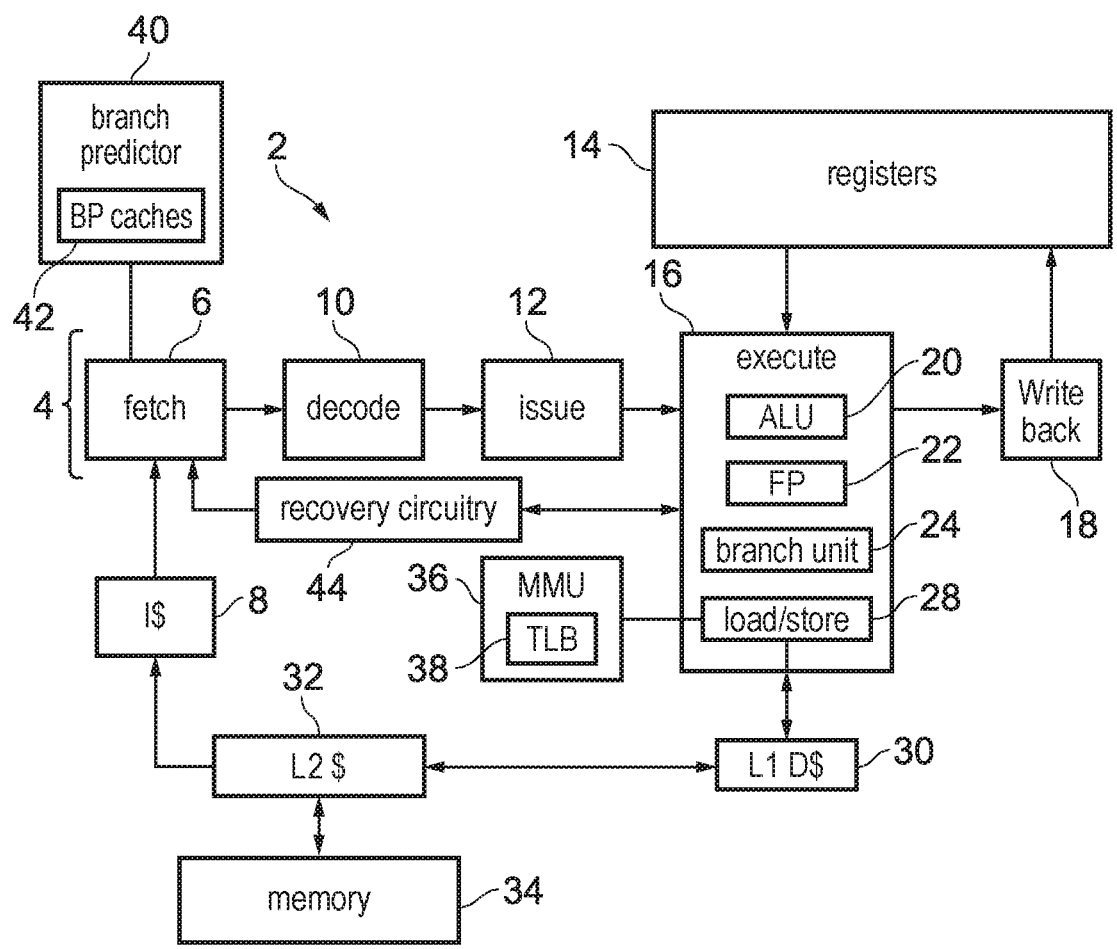
FIG. 1 schematically illustrates a data processing apparatus.

Before discussing the embodiments with reference to the accompanying figures, the following description of embodiments is provided.

In some example configurations there is provided a data processing apparatus comprising: a prediction cache to store a plurality of prediction entries, each of the plurality of prediction entries defining an association between a prediction cache lookup address and a predicted behaviour; prediction circuitry to select a prediction entry based on a prediction cache lookup of the prediction cache based on a given prediction cache lookup address and to determine the predicted behaviour associated with the given prediction cache lookup address based on the selected prediction entry; and a candidate prediction buffer to store a plurality of candidate predictions, each of the plurality of candidate predictions indicative of a candidate prediction entry to be selected for inclusion in a subsequent prediction cache lookup, wherein the candidate prediction entry is selected in response to a candidate prediction lookup in the candidate prediction buffer based on a candidate lookup address different to a candidate prediction cache lookup address indicated as associated with a candidate predicted behaviour in the candidate prediction entry.

The prediction circuitry, in combination with the prediction cache, provides the capability to predict behaviour associated with the given prediction cache lookup address which is received from a data processing pipeline. The prediction circuitry performs a prediction cache lookup based on the target address received from the data processing pipeline. In response to a hit in the prediction cache, the prediction circuitry determines a predicted behaviour from the predicted information stored in the prediction cache in association with the given prediction cache lookup address. The prediction cache is located close to the processing pipeline to provide rapid predictions. However, the inventors have recognised that such a prediction cache may not be large enough to support all entries required by a given program and that latency associated with predictions may be reduced if the selection performed by the prediction circuitry can also include candidate predictions that are included in the selection based on observations of repeated behaviour in the processing pipeline. For this reason there is provided a candidate prediction buffer to store a plurality of candidate predictions. The candidate predictions each associate a candidate prediction entry with a candidate lookup address. The candidate lookup address is different to the candidate prediction cache lookup address that is associated with the candidate predicted behaviour in the candidate prediction entry. Because the candidate lookup address is different to the candidate prediction cache lookup address that is associated with the candidate predicted behaviour in the candidate prediction entry, a candidate lookup can be performed in the candidate prediction buffer based on the candidate lookup address and, when the candidate lookup hits in the candidate prediction buffer the candidate prediction entry associated with the candidate prediction address is provided to the prediction circuitry to be included in a subsequent prediction cache lookup and can therefore be used to provide subsequent predicted behaviour. Using this mechanism it is possible to provide candidate prediction entries for selection that may not be present in the prediction cache due to, for example, size constraints of the prediction cache. As the candidate predicted behaviours are identified based on a candidate lookup address different to the candidate prediction cache lookup address, it is possible to identify, before the cycle in which the candidate prediction cache lookup address itself is encountered, a candidate prediction entry that might be useful for making a prediction for the candidate prediction cache lookup address in a future cycle. Hence, the provision of the candidate prediction buffer increases the likelihood that the prediction cache lookup will hit on a prediction entry either based on the entries that are already present in the prediction cache or based on a candidate prediction that has been included in the prediction cache lookup based on an earlier identification that the candidate prediction was likely to be needed.

The size and position of the prediction cache may be variously defined. However, in some example configurations the prediction cache is capable of processing successive prediction cache lookups with a single cycle delay between a first prediction cache lookup based on a first given prediction cache lookup address and a second prediction cache lookup based on a second given prediction cache lookup address. In some examples, the second given prediction cache lookup address may be derived from the predicted behaviour determined based on the first prediction cache lookup. The prediction cache may be capable of returning the predicted behaviour corresponding to a given prediction cache lookup address in a same cycle as the prediction lookup is initiated for the given prediction cache lookup address.

In some example configurations the prediction cache is a branch target buffer and each of the plurality of prediction entries comprises information defining a branch target address prediction. The given prediction cache lookup address may correspond to a block of instructions in which zero, one, or more branch instructions may be present. The branch target address prediction may comprise a determination of a predicted branch instruction in the block of instructions, whether there is at least one branch at all in the block of instructions, address offsets of one or more branches within the block of instructions, and other branch properties such as the type of branch. By providing a lower latency branch target buffer where additional candidate prediction entries are supplied based on a candidate prediction lookup address, different to the candidate prediction cache lookup addresses that are associated with the candidate predicted behaviours in the candidate prediction entries, latencies associated with misses in the branch target buffer can be reduced.

In some example configurations the prediction cache is a micro branch target buffer and the apparatus comprises a main branch target buffer, wherein the micro branch target buffer comprises fewer entries than the main branch target buffer, and wherein the data processing apparatus is configured to perform a lookup in the main branch target buffer in response to a miss occurring in the micro branch target buffer. The main branch target buffer stores a plurality of prediction entries defining an association between a prediction cache lookup address and a predicted behaviour. In this way the entries stored in the main branch target buffer may be similar in structure to those stored in the micro branch target buffer. The micro branch target buffer (which may also be referred to as a nano branch target buffer) may contain a relatively small number of entries resulting in a smaller circuit footprint. For example, a micro branch target buffer may store approximately 100 prediction entries whilst the main branch target buffer may store approximately 1024 prediction entries. The person of ordinary skill would appreciate that the approximate sizes are for illustrative purpose only and that micro and main branch target buffers of any size could be provided. As a result the micro branch target buffer can be implemented with shorter path delays on signal paths used to access the micro branch target buffer (compared to the main branch target buffer), to provide lower latency predictions than the main branch target buffer. In the event that the prediction cache lookup misses in the micro branch target buffer, a further lookup is performed in the main branch target buffer. A hit in the main branch target buffer may result in the entry which hit in the main branch target buffer being promoted to the micro branch target buffer which may result in existing entries of the micro branch target buffer being evicted based on an eviction policy. For example, the least recently used or least frequently used entries in the micro branch target buffer may be evicted to make room for the entry which hit in the main branch target buffer. It would be readily apparent to the person of ordinary skill in the art that these eviction policies are for illustrative purpose and any eviction policy known to the person of ordinary skill in the art may be used. The main branch target buffer performs a different function to the candidate prediction buffer. The candidate prediction buffer stores candidate predictions which are looked up based on a candidate lookup address, and where each candidate prediction defines an association between a candidate prediction cache lookup address (that is different to the candidate lookup address) and a candidate predicted behaviour. On the other hand the main branch target buffer defines an association between a prediction cache lookup address (that is the address which is used to perform the lookup in the main branch target buffer) and a predicted behaviour. Hence, when a lookup misses in the micro branch target buffer two lookups are performed (at least when candidate prediction buffer lookups are enabled). Firstly, a candidate prediction lookup is performed in the candidate prediction buffer, regardless as to whether the prediction cache lookup in the branch target buffer hits or misses, to determine a candidate prediction to be used in a subsequent prediction cache lookup. Secondly, a lookup is performed in the relatively slower main branch target buffer to determine a predicted behaviour associated with the prediction cache lookup address that has missed in the micro branch target buffer.

In some example configurations, when the candidate prediction lookup of the candidate prediction buffer is enabled, the data processing apparatus is configured to perform the candidate prediction buffer lookup based on the candidate lookup address independent of whether the candidate prediction cache lookup address hits or misses in the prediction cache. When performing the prediction cache lookup the data processing apparatus is configured to also perform the candidate prediction lookup. In this way, when there is a hit in the candidate prediction buffer and (when the candidate prediction lookup is enabled) regardless as to whether the prediction cache lookup hit or missed in the prediction cache, the data processing apparatus is able to provide the candidate prediction entry for inclusion in the subsequent prediction cache lookup, thereby reducing the possibility of a subsequent miss in the subsequent prediction cache lookup.

In some example configurations the data processing apparatus is configured to derive, in response to a miss in both the prediction cache and a previously selected candidate prediction entry included in the prediction cache lookup, a new candidate prediction and to store the new candidate prediction in the candidate prediction buffer. In other words, in response to a prediction cache lookup, which checks both the prediction cache itself and the previously selected candidate prediction entry included in the prediction cache lookup based on a previous candidate prediction buffer lookup, and determines that none of these checked entries correspond to the given prediction cache lookup address for the prediction cache lookup, the data processing apparatus is triggered to derive a new candidate prediction entry which is then stored in the candidate prediction buffer. The new candidate prediction may be derived in various ways. For example, the candidate prediction could be derived based on observed behaviour of one or more stages of the data processing pipeline, or from combinations of existing branch predictions.

In some embodiments the new candidate prediction comprises, as the candidate lookup address, an address predicted to be encountered at least one cycle earlier than the candidate prediction cache lookup address in a sequence of instruction addresses. This can be implemented, for example, by providing a storage element comprising addresses that have been looked up in the prediction cache or a main branch target buffer. In particular, in response to a first prediction cache lookup based on a first prediction cache lookup address, the first prediction cache lookup address could be stored in the storage element. Hence, subsequent to a first prediction cache lookup, based on the first prediction cache lookup address, the first prediction cache lookup address is stored in the storage element regardless as to whether the first prediction cache lookup hits or misses. Subsequently, when a second prediction cache lookup occurs based on a second prediction cache lookup address, where the second prediction cache lookup occurs sequentially after the first prediction cache lookup, and the second prediction cache lookup misses, i.e., the second prediction cache lookup address is not found in the prediction cache or the previously selected candidate prediction entry which is included in the second prediction cache lookup, a new prediction is derived based on the first prediction cache lookup address that is stored in the storage element and information forming a new candidate prediction entry which can be derived from the main branch target buffer or the data processing pipeline associated with the prediction circuitry. The addition of a new candidate prediction to the candidate prediction buffer may result in an existing entry from the candidate prediction buffer being based on an eviction policy. For example, the least recently used or least frequently used entries in the candidate prediction buffer may be evicted to make room for the new candidate prediction. It would be readily apparent to the person of ordinary skill in the art that these eviction policies are for illustrative purpose and any eviction policy known to the person of ordinary skill in the art may be used.

The candidate lookup address may be variously defined and may correspond to any address that is fetched by the data processing pipeline. However, in some example configurations the prediction circuitry is configured to perform both the prediction cache lookup and the candidate prediction lookup based on a same address as the given prediction cache lookup address and the candidate lookup address. Whilst the prediction cache lookup and the candidate prediction lookup are based on the same address the timing of the lookups may be variously defined. In some embodiments the prediction cache lookup and the candidate prediction lookup occur at a same cycle. However, in other embodiments the candidate prediction lookup may be offset from the prediction cache lookup by one or more cycles. For example, the candidate prediction lookup for the same address may be performed one or more cycles ahead of the prediction cache lookup for the same address. Alternatively, the candidate prediction lookup for the same address may be performed one or more cycles behind the prediction cache lookup for the same address. By performing the candidate prediction lookup based on the same address as the prediction cache lookup, the candidate prediction buffer can be searched to identify entries that may be predicted to be useful for a future prediction cache lookup for an address following one or more cycles after the cycle in which the lookup address is looked up. As a result the candidate prediction buffer is able to pass candidate predictions to be included in the subsequent prediction cache lookup at least one lookup ahead of the subsequent prediction cache lookup.

The provision of the candidate prediction to be included in the subsequent candidate lookup may be variously defined. In some example configurations, a single entry buffer may be provided to store the candidate prediction entry which is looked up in combination with the prediction cache lookup. In some example configurations the data processing apparatus further comprises prediction cache allocation circuitry to allocate, to the prediction cache, the candidate prediction entry selected for inclusion in the subsequent prediction cache lookup. This entry could be allocated directly from the prediction cache or from the single entry buffer. By allocating candidate entries from the candidate prediction buffer into the prediction cache the likelihood of obtaining a hit in the prediction cache can be increased.

In some example embodiments the prediction cache is one of a set-associative cache or a direct mapped cache with associativity N≥1, wherein the data processing apparatus comprises indexing circuitry to generate a prediction cache index based on a prediction cache indexing scheme, and wherein the candidate prediction buffer has associativity M>N. Based on the prediction cache indexing scheme a number of given prediction cache lookup addresses may be mapped to a same prediction cache index. In this situation the prediction entry may be selected based on a tag derived from the given prediction cache lookup address and stored in association with the predicted behaviour. When P prediction cache lookups are performed in quick succession based on P different prediction cache lookup addresses which all map to the same index and P>N a conflict will occur as the prediction cache cannot store entries for all P addresses. In such a situation it is possible that, if M were to be chosen to be equal to N a similar capacity conflict could occur in the candidate prediction buffer. Hence, by providing a candidate prediction buffer with associativity M>N it is possible to reduce the risk that, on a capacity conflict involving P>N addresses aliasing to the same prediction cache index in the prediction cache, the corresponding candidate prediction entries for predicting when those prediction cache entries may be useful also have a capacity conflict in the prediction cache.

In some example configurations the prediction cache is a fully-associative cache, each of the plurality of entries in the prediction cache comprises a tag based on the prediction cache lookup address of the prediction entry. The tag may be defined based on a hash function of the whole of the prediction cache lookup address. Using a fully associative cache provides flexibility in placement of predictions within the prediction cache, but may still encounter some capacity conflict issues causing prediction cache misses, for which the candidate prediction buffer may help to reduce latency.

In some example configurations the data processing apparatus further comprises control circuitry configured to disable the candidate prediction lookup when a condition is met. The candidate prediction buffer and the associated circuitry is typically relatively power hungry. However, there are situations when the use of the candidate prediction buffer is unlikely to provide an advantage. For example, when all the required entries are already present in the prediction cache then the candidate prediction buffer is unable to provide further candidate prediction entries that provide additional information relevant to the prediction cache lookup. Hence, in these situations the candidate prediction lookup is disabled when a condition is met.

The condition may be variously defined, however, in some example configurations the condition is based on a metric indicative of utilisation of the prediction cache, where in some example configurations the metric indicative of utilisation of the prediction cache is based on at least one of: an allocation metric associated with a number of entries allocated to the prediction cache; an eviction metric associated with a number of entries evicted from the prediction cache; a number of unallocated entries in the prediction cache; and a metric indicative of a number of hits in the prediction cache. For example, where the metric of utilisation indicates that few or zero entries have been recently allocated to the prediction cache, the candidate prediction lookup may be disabled to reduce power consumption. Similarly, if the eviction metric indicates that few entries have been evicted then it may be that no new entries are being allocated to the prediction cache and the candidate prediction lookup may be disabled to reduce power consumption. In addition, or as an alternative, if the number of allocated entries in the prediction cache is less than the size of the prediction cache then it may be no further predictions are currently required. In this situation the candidate prediction lookup may be disabled to reduce power consumption. Alternatively, if the number of hits in the prediction cache is high then it may be that no new candidate entries in the prediction cache are required. It would be readily apparent to the person of ordinary skill in the art that any of these metrics can be used alone or in combination to provide the metric indicative of utilisation of the prediction cache.

In some example embodiments the condition is based on a metric indicative of a state of a processing pipeline of the data processing apparatus. The condition may be exclusively based on the metric indicative of the state of the processing pipeline or the data processing apparatus but may also be used in combination with the metric indicative of utilisation of the prediction cache. In some example configurations, the metric indicative of the state of the processing pipeline is based on at least one of: a queue occupancy; and a stall in the processing pipeline. For example, if a fetch queue, issue queue, or other queue associated with the processing pipeline has a large number of entries present then the downstream pipeline may not be able to take further instructions and there may be no benefit to continue to lookup candidate prediction entries in the candidate prediction buffer. As a result the candidate prediction lookup may be disabled to save power. Similarly, when a stall is detected in the processing pipeline there may be no benefit to continue to lookup candidate prediction entries and the candidate prediction lookup may be similarly disabled.

In some example configurations the data processing apparatus is configured, in response to a determination that the candidate prediction entry is already present in the prediction cache, to discard the candidate prediction entry in the subsequent prediction cache lookup. During processing it is common for prediction entries in the prediction cache to change. For example, prediction entries may be updated based on actual outcomes resolved at the execute stage. Hence, when a candidate prediction entry corresponds to a prediction entry that is already present in the prediction cache, the allocation circuitry is configured to use the information from the prediction entry already included in the prediction cache to form the prediction (as this information may be more up to date) and maintain the prediction entry that is already present in the prediction cache. In addition, when a prediction entry is evicted from the prediction cache, a corresponding entry in the candidate prediction buffer may be updated to correspond to the prediction entry that is evicted from the prediction cache. In this way the candidate prediction buffer can be kept up to date based on the prediction entry in the prediction cache. In alternative embodiments it may not be necessary to update the candidate prediction entries when a prediction entry is evicted from the prediction cache. Such an approach avoids the requirement to implement a the candidate prediction buffer as a content addressable memory that is searchable by the candidate prediction cache lookup address.

In some example configurations the data processing apparatus comprises recovery circuitry to, in response to detecting a misprediction based on the predicted behaviour, perform a recovery action. Processing based on predicted behaviour is a form of speculative execution and the correct outcome may not be resolved until later, by which time other instructions may have been processed incorrectly based on the predicted behaviour. When it is determined that a misprediction has occurred and that the speculatively executed instructions are incorrect, the recovery circuitry may be able to flush the processing pipeline and rewind the changes made by the data processing apparatus to a less speculative or non-speculative state.

Particular embodiments will now be described with reference to the figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. A memory management unit (MMU) 36 controls address translations between virtual addresses specified by load/store requests from the load/store unit 28 and physical addresses identifying locations in the memory system, based on address mappings defined in a page table structure stored in the memory system. The page table structure may also define memory attributes which may specify access permissions for accessing the corresponding pages of the address space, e.g. specifying whether regions of the address space are read only or readable/writable, specifying which privilege levels are allowed to access the region, and/or specifying other properties which govern how the corresponding region of the address space can be accessed. Entries from the page table structure may be cached in a translation lookaside buffer (TLB) 38 which is a cache maintained by the MMU 36 for caching page table entries or other information for speeding up access to page table entries from the page table structure shown in memory.

In this example, the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

The data processing apparatus 2 also has a branch predictor 40 which may include one or more branch prediction caches 42 for caching prediction information used to form predictions of branch behaviour of branch instructions to be executed by the branch unit 24. The predictions provided by the branch predictor 40 may be used by the fetch stage 6 to determine the sequence of addresses from which instructions are to be fetched from the instruction cache 8 or memory system. The branch prediction caches may include a number of different forms of cache structure, including a branch target buffer (BTB) which may cache entries specifying predictions of whether certain blocks of addresses are predicted to include any branches, and if so, the instruction address offsets (relative to the start address of the block) and predicted target addresses of those branches. Also the branch prediction caches 42 could include branch direction prediction caches which cache information for predicting, if a given block of instruction addresses is predicted to include at least one branch, whether the at least one branch is predicted to be taken or not taken. The data processing apparatus 2 further includes recovery circuitry 44 to, in response to detecting a misprediction by the branch predictor 40 based on the predicted behaviour, perform a recovery action (e.g. flushing the pipeline 4 of instructions beyond the address for which the mispredictions occurred, and resuming execution from the misprediction point). When a mispredictions occurs or when the branch unit 24 resolves an actual branch outcome for a new branch not previously predicted based on the prediction state in the branch prediction caches 42, the information in the branch prediction caches 42 may also be updated based on the actual branch outcome.

Figure 2A:
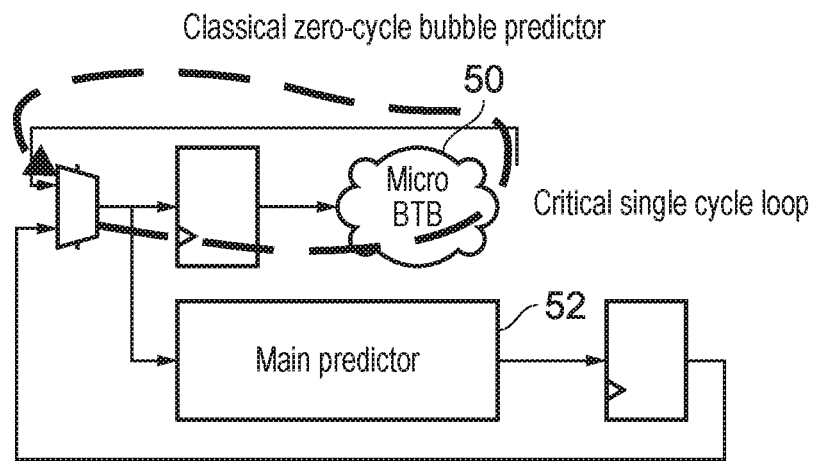
FIG. 2A schematically illustrates details of a branch target buffer.
Figure 2B:
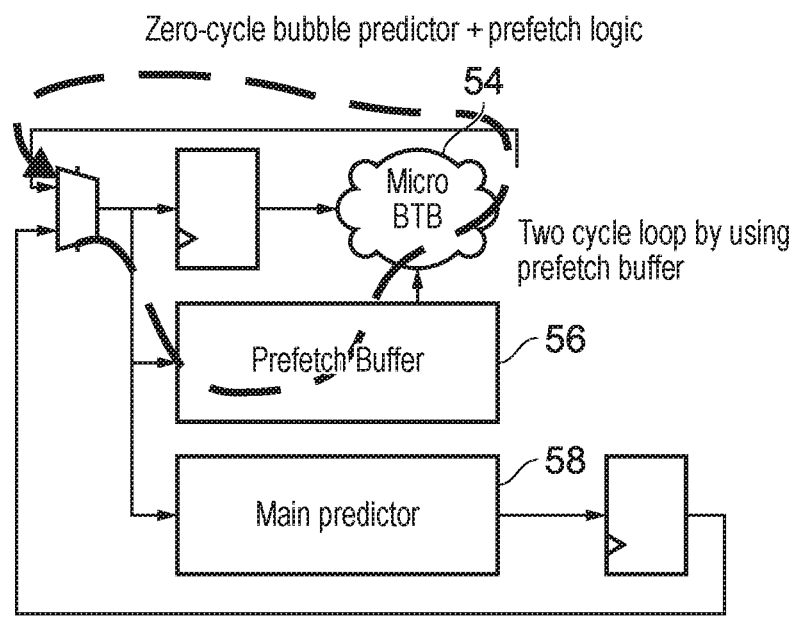
FIG. 2B schematically illustrates details of a branch target buffer combined with a candidate prediction buffer.

FIGS. 2A and 2B schematically illustrate the use of the candidate prediction buffer. FIG. 2A schematically illustrates a classical zero-cycle bubble predictor based on a critical single loop cycle. In particular, a micro branch target buffer (BTB) 50 is provided in addition to a main predictor 52. When a prediction cache lookup address is passed to the BTB a lookup is performed in the micro branch target buffer 50. If the lookup hits, i.e., if the micro branch target buffer 50 contains an entry that corresponds to the prediction cache lookup address then predicted behaviour can be rapidly determined in a single loop cycle. Specifically, successive lookups in the micro BTB 50 can be performed with a single cycle delay between a first micro BTB lookup based on a first given prediction cache lookup address and a second micro BTB lookup based on a second given prediction cache lookup address. The micro BTB 50 schematically illustrated in FIG. 2A is limited in that when a miss occurs in the micro BTB 50 a lookup in the main predictor has to be performed. Due to the relatively small size of the micro BTB, that is required in order to obtain the single cycle delay, it is likely that for many programs there will be a number of misses in the micro BTB and higher latency lookups will have to be performed in the main predictor 52.

FIG. 2B on the other hand illustrates the use of a prefetch buffer (candidate prediction buffer) 56 to reduce the likelihood of misses in the micro BTB. Specifically, when a prediction cache lookup address is passed to the prediction cache a prediction cache lookup is performed in the prediction cache (micro BTB) 54. If the prediction cache lookup hits, i.e., if the micro BTB 54 contains an entry that corresponds to the prediction cache lookup address then predicted behaviour can be rapidly determined in a single loop cycle, and the predicted branch target address from the micro BTB can be returned to use as the looked up instruction address in the next cycle. Specifically successive lookups in the micro BTB 54 can be performed with a single cycle delay between a first prediction cache lookup based on a first given prediction cache lookup address and a second prediction cache lookup based on a second given prediction cache lookup address (where the second given prediction cache lookup address is derived from the predicted branch target address obtained in the first micro BTB lookup). In addition to the prediction cache lookup, a candidate prediction lookup using a candidate lookup address is performed in the prefetch buffer (candidate prediction buffer) 56. The prefetch buffer (candidate prediction buffer) 56 comprises a plurality of entries that each define a candidate prediction based on the candidate lookup address. When a hit occurs in the prefetch buffer (candidate prediction buffer) 56 the candidate prediction entry that is hit is selected for inclusion in a subsequent prediction cache lookup in the micro BTB 54 (prediction cache). In this way the prefetch buffer (candidate prediction buffer) 56 is able to supply predictions to the micro BTB (prediction cache) 54 prior to the predictions being looked up in the micro BTB (prediction cache) 54. By supplying additional entries to the micro BTB (prediction cache) 54 the effective number of predictions that can be supplied by the micro BTB (prediction cache) 54 is increased. As in the case of FIG. 2A, if the prediction cache lookup misses, i.e., the entry is not present in the micro BTB (prediction cache) 54 and has not been supplied by the prefetch buffer (candidate prediction buffer) 56 then a lookup is performed in the main predictor 58.

Figure 3:
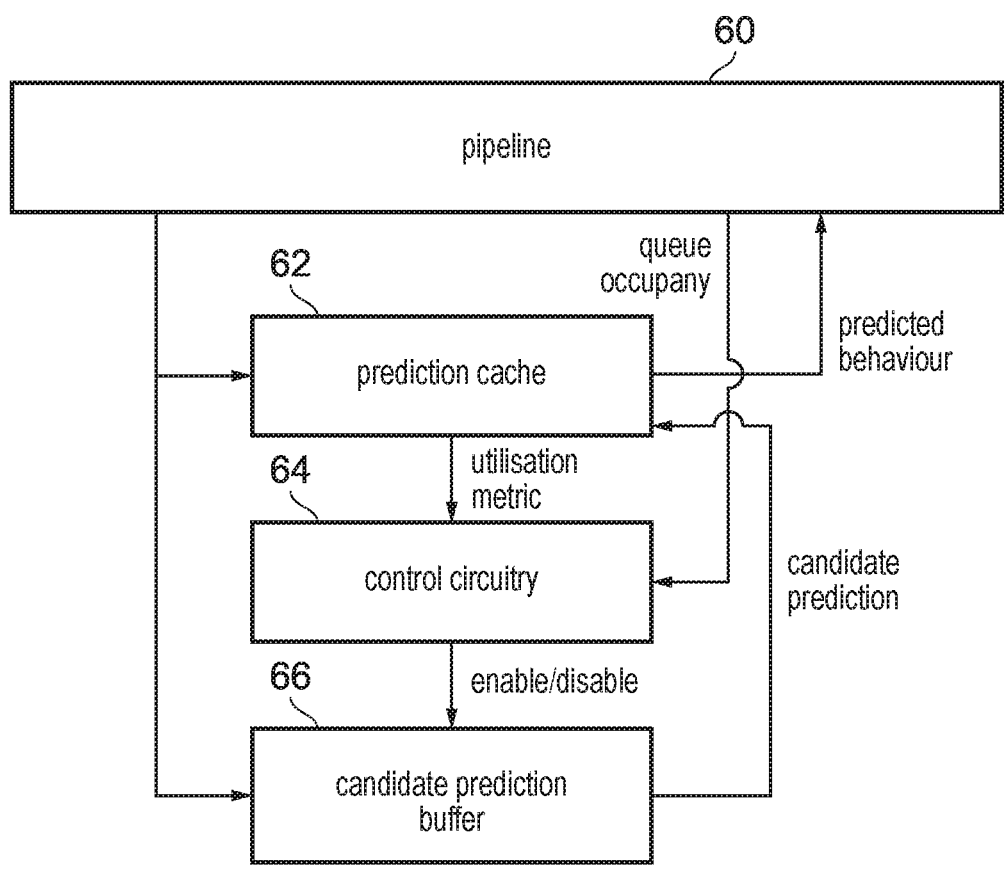
FIG. 3 schematically illustrates details of a data processing apparatus comprising a processing pipeline, a prediction cache, control circuitry, and a candidate prediction buffer.

FIG. 3 schematically illustrates further details of the prediction cache and the candidate prediction buffer that may embody various examples of the present techniques. In particular, the candidate prediction lookups in the candidate prediction buffer 66 may be relatively power hungry and, as discussed above, such lookups are not always necessary. Hence, in some example configurations the data processing apparatus further comprises control circuitry 64 to disable the candidate prediction lookup when a condition is met. As illustrated in FIG. 3, the control circuitry 64 can obtain one or more utilisation metrics from the prediction cache 62 and an indication of the queue occupancy from the pipeline 60.

Based on these metrics the control circuitry determines whether candidate prediction lookups in the candidate prediction buffer 66 are enabled or disabled. In particular, when the utilisation metric or the queue occupancy indicates that there is no gain in performance associated with the candidate prediction buffer 66 the candidate prediction lookups are disabled to reduce power consumption. For example if the queue occupancy indicates that a queue associated with the pipeline has more than a threshold number of entries then there may be no benefit to the candidate prediction lookups and the control circuitry 64 may disable these. Alternatively, if the utilisation metric indicates that the prediction cache 62 is only using a subset of entries or that there are no new entries being added to the prediction cache 62 then the control circuitry 64 may also choose to disable the candidate prediction lookups. As previously discussed the control circuitry 64 may also base the decision to disable the candidate prediction lookup on any metrics associated with the data processing apparatus 2.

Figure 4:
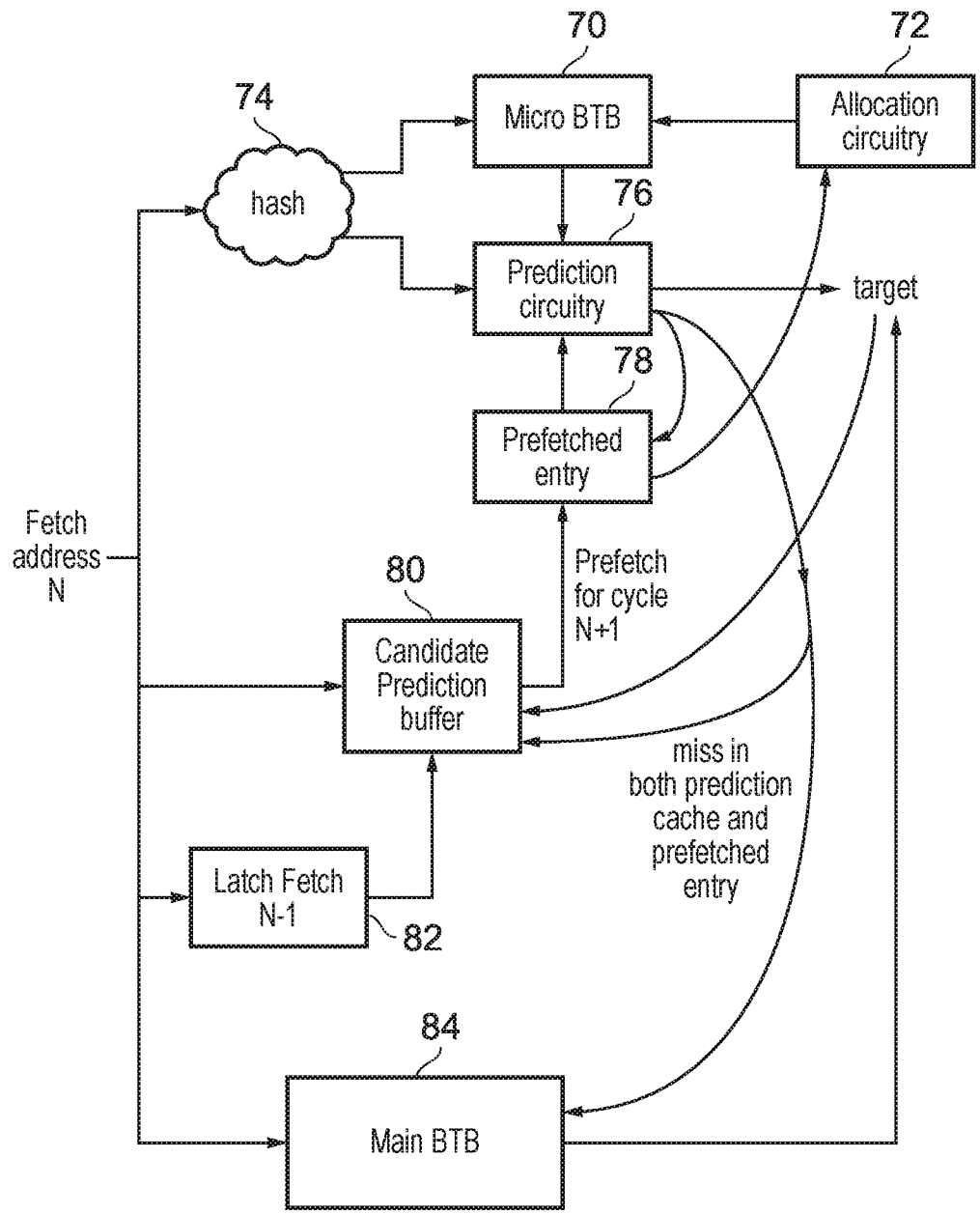
FIG. 4 schematically illustrates details of target identification by prediction circuitry based on a fetch address.

FIG. 4 schematically illustrates further details of elements of the data processing apparatus that are used to determine predicted behaviour of the processing pipeline. A fetch address is provided by fetch circuitry 6, in the illustrated example the fetch address that is provided is the N-th fetch address in a sequence of fetch addresses. Fetch address N is input, optionally via hash circuitry 74 to the prediction cache which in the illustrated embodiment is provided by micro BTB 70 and the prediction circuitry 76 to perform the prediction cache lookup. If fetch address N corresponds to a prediction entry in the micro BTB 70 then the corresponding entry is output to the prediction circuitry 76. As discussed, the micro BTB 70 may be variously defined as a direct mapped cache, a set-associative cache or a fully associative cache. In the event of a hit, a prediction entry corresponding to a hashed fetch address N can be passed to the prediction circuitry 76. Alternatively, or in addition, the prediction circuitry 76 determines, based on the hashed value of the fetch address N, whether the prefetched entry 78 obtained from the candidate prediction buffer 80 (based on a lookup of the candidate prediction buffer 80 in an earlier cycle N−1) corresponds to the hashed value of fetch address N. In the event that the prediction cache lookup hits in either the micro BTB 70 or the prefetched entry 78 a target prediction is output by the prediction circuitry 76. In addition, when the prediction cache lookup hits in the prefetched entry 78 and not in the micro BTB 70, the prediction circuitry 76 passes the prefetched entry 78 to the allocation circuitry 72 which allocates the prefetched entry 78 from the candidate prediction buffer 80 into the micro BTB 70.

In addition to the candidate prediction lookup a lookup may be performed in a main BTB 84. The main BTB lookup occurs when the prediction circuitry 76 indicates to the main BTB 84 that a miss has occurred in both the micro BTB 70 and the prefetched entry 78. In the event that a hit occurs in the main BTB 84 in response to the main BTB lookup, the predicted branch target is output. In the event of a miss in the main BTB 84 in response to the main BTB lookup the target that is output corresponds to a prediction of the next address to occur sequentially after fetch address N.

In addition to the prediction cache lookup a candidate prediction lookup is performed in the candidate prediction buffer 80. As discussed, the candidate prediction buffer 80 comprises a plurality of candidate predictions each of which relates a candidate lookup address to a candidate prediction entry. If the candidate prediction lookup based on fetch address N (which may be hashed by the candidate prediction circuitry using a same or a different hash function to that of the hash circuitry 74) hits in the candidate prediction buffer 80 then the entry corresponding to fetch address N is passed from the candidate prediction buffer 80 to the prefetched entry 78 for inclusion in a subsequent prediction cache lookup. In the event that the candidate prediction lookup misses in the candidate prediction buffer 80 and the prediction circuitry 76 indicates that the prediction cache lookup has also missed then a new candidate prediction is generated. The new candidate prediction is based on the target that is output by the prediction circuitry 76 or the main BTB 84, the current fetch address (fetch address N) and the previous fetch address (fetch address N−1) which is latched in the latch circuitry 82. Using this information a new prediction can be generated that associates the fetch address N−1, fetch address N and the behaviour predicted to be associated with fetch address N. The new prediction can be stored in the candidate prediction buffer 80 in preparation for a subsequent occurrence of the same sequence of fetch addresses. If a separate branch direction predictor (not shown in FIG. 4) predicts a taken outcome, the target address predicted in FIG. 4 becomes fetch address N+1 for the next cycle. If the separate branch direction predictor predicts a not taken outcome, or none of the prefetched entry 78, micro BTB 70 or main BTB 84 detects a hit then fetch address N+1 is derived by incrementing fetch address N by an increment corresponding to the instruction block size.

Figure 5:
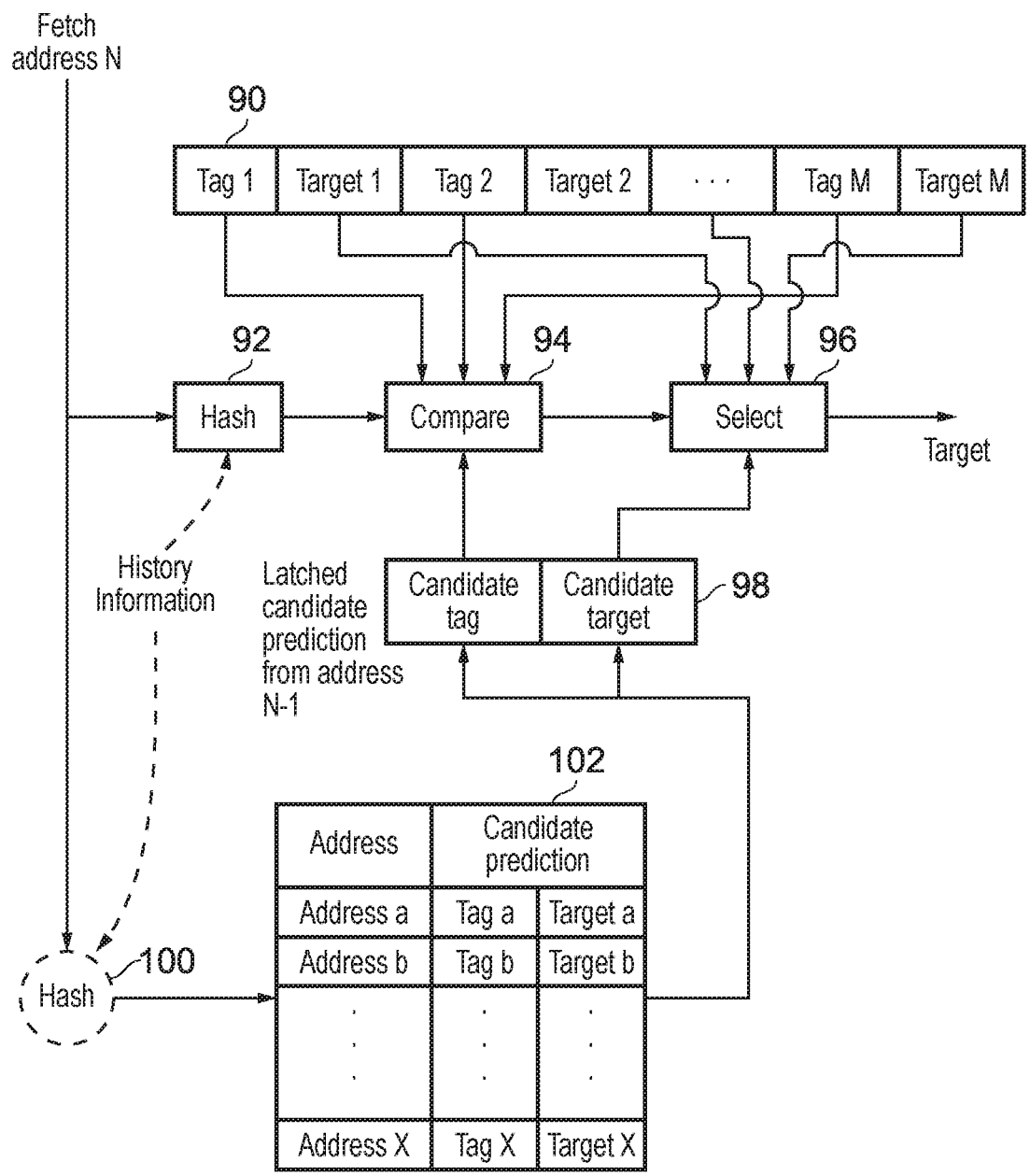
FIG. 5 schematically illustrates details of target identification by prediction circuitry based on a fetch address.

FIG. 5 schematically illustrates further details relating to the determination of the predicted behaviour (target) based on fetch address N. In the illustrated embodiment the prediction cache is a fully associative cache. The input fetch address N is hashed by hash circuitry 92, to generate a tag corresponding to fetch address N. The hash circuitry 92 may, in some embodiments, base the hash function on branch history information including, for example, a sequence of recently taken and not taken branches. In this way the predicted behaviour is based not only on fetch address N but also on information relating to previous branches that determine how the program flow arrived at fetch address N. Compare circuitry 94 (which may form part of the prediction circuitry) compares the hashed output of hash circuitry 92 to the tags stored in the prediction cache 90 and to a candidate tag stored in the prefetched entry 98. If the compare circuitry 94 determines that a hit has occurred the compare circuitry 94 passes an indication of the target entry (or candidate target) that corresponds to the hashed fetch address N to the select circuitry 96 (which may form part of the prediction circuitry). Based on the indication of the target entry (or candidate target entry), select circuitry 96 obtains the predicted behaviour (branch target address) corresponding to the indication and outputs it as the target predicted behaviour. As a concrete example, both tag 2 stored in prediction cache 90 and the candidate tag stored in the prefetched entry 98 may have previously been generated based on fetch address N. However, tag 2 may correspond to a first sequence of historical information regarding branch history and the candidate tag may correspond to a second sequence of historical information regarding branch history. When the hash circuitry 92 receives the fetch address N it generates a tag based on a recent set of historical information. If the historical information corresponds to the first sequence of historical information then the compare circuitry 94 will determine that the tag output from hash circuitry 94 corresponds to tag 2 and will pass an indication of this to the selection circuitry 96 which, in turn, will select target 2 from the prediction cache 90. Alternatively, if the historical information corresponds to the second sequence of historical information then the compare circuitry 94 will determine that the tag output from the hash circuitry 94 corresponds to the candidate tag and will pass an indication of this to the selection circuitry 96 which in turn, will select the candidate target from the prefetched entry 98. A third alternative is that the historical information corresponds to neither of the first sequence of historical information or the second sequence of historical information in which case the compare circuitry will determine that a miss has occurred and a lookup may be performed in the main BTB as discussed in relation to FIG. 4.

In addition to the prediction cache lookup a second lookup occurs in the candidate prediction buffer 102. The fetch address may be hashed by hash circuitry 100. The hash circuitry 100 may also use historical input to generate the hash however, the hash function may be different to the hash function used by hash circuitry 92. The candidate prediction buffer 102 compares the output of the hash circuitry 100 to information indicative of an address. In particular, the candidate prediction buffer 102 determines, based on the hashed fetch address N, whether a candidate prediction corresponding to fetch address N is stored in the candidate prediction buffer 102. If so then the candidate prediction comprising a candidate tag portion (tag calculated based on the hash function used by hashing circuitry 92, not hashing circuitry 100) and a candidate target portion is allocated to the prefetched entry 98 for inclusion in a subsequent prediction cache lookup. For example, if the hashed fetch address N output by the hash circuitry 100 corresponds to Address b for example, then the candidate prediction b comprising Tag b and Target b is allocated to the prefetched entry 98 for inclusion in the subsequent prediction cache lookup.

Figure 6A:
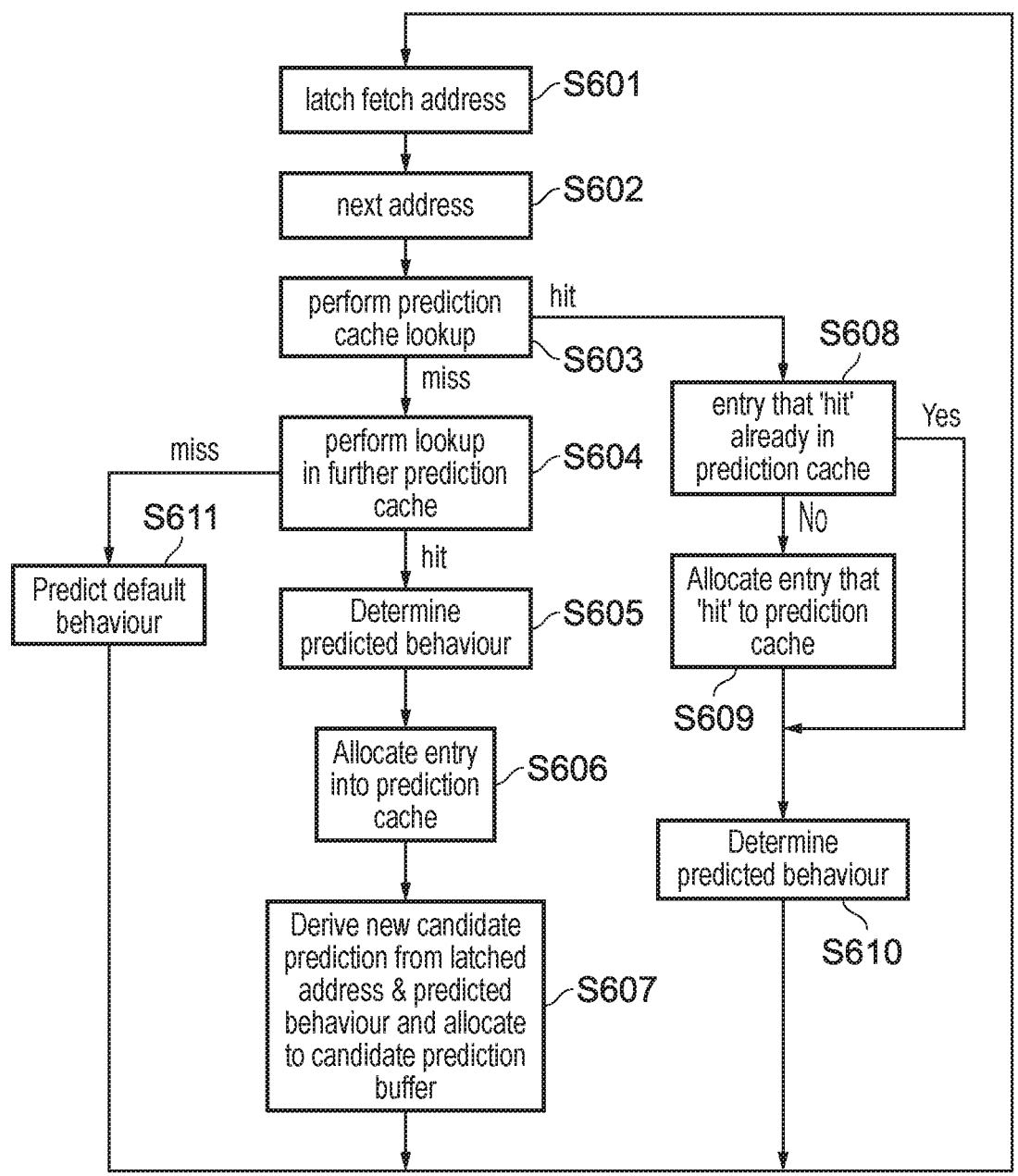
FIG. 6A schematically illustrates a sequence of steps carried out in relation to a prediction cache during the determination of predicted behaviour.
Figure 6B:
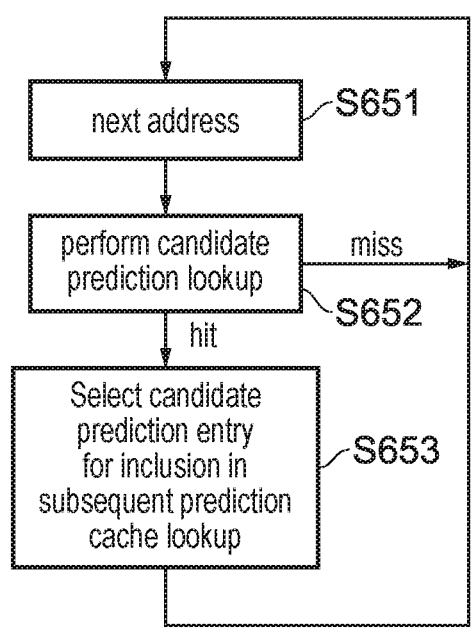
FIG. 6B schematically illustrates a sequence of steps carried out in relation to a candidate prediction buffer during the determination of predicted behaviour.

FIGS. 6A and 6B schematically illustrates a sequence of steps carried out when performing lookups in the prediction cache and the candidate prediction buffer. Considering the sequence of steps in FIG. 6A to start at step S601 where a previously fetched address is latched before flow proceeds to step S602 to wait for a next fetch address. When a block of instructions is fetched based on a fetch address flow proceeds to step S603 where a prediction cache lookup is performed. The prediction cache lookup may include an entry previously selected from the candidate prediction buffer that has not yet been allocated into the prediction cache. If the prediction cache lookup hits in the prediction cache then flow proceeds to step S608 where it is determined whether the entry that hit in the prediction cache lookup corresponds to an entry that is already present in the prediction cache or, alternatively, whether the entry corresponds to an entry that has been selected form the candidate prediction buffer by a previous candidate prediction lookup that has not yet been allocated to the prediction cache. It the entry is already present in the prediction cache then flow proceeds to step S610. Alternatively, if the entry that hit is not already in the prediction cache then flow proceeds to step S609 where the entry may be allocated to the prediction cache before flow proceeds to step S610. At step S610 the predicted behaviour is determined by the prediction circuitry from the entry that hit in the prediction cache lookup before flow returns to step S601. Alternatively, when the prediction cache lookup performed at step S603 misses in the prediction cache (i.e. neither the prediction cache itself, nor any prefetched entry 78 identified in a previous candidate buffer lookup, matches the looked up fetch address) flow proceeds to step S604 where a lookup is performed in a further prediction cache (which in some embodiments is the main BTB). If the lookup in the further prediction cache hits then flow proceeds to step S605 where the predicted behaviour is determined by the prediction circuitry based on the entry that hit in the further prediction cache. Flow then proceeds to step S606 where the entry that hit in the main BTB is allocated to the prediction cache (micro BTB) before flow proceeds to step S607 where a new candidate prediction is derived from the latched address and the predicted behaviour and the new candidate prediction is allocated to the candidate prediction buffer and flow returns to step S601. Alternatively, when the lookup in the further prediction cache at step S604 misses flow proceeds to step S611 where the default behaviour is predicted. For example, in the case where the prediction cache is a micro BTB and the further prediction cache is a main BTB, the default behaviour could be to predict the next sequential address. In some embodiments an entry may be allocated into the candidate prediction buffer in response to a miss in the further prediction cache based on the subsequent behaviour of the block of instructions during an execution stage. However, it may be more efficient to wait for an entry to be allocated into the prediction caches before subsequently adding an entry to the candidate prediction buffer as set out in the preceding steps.

FIG. 6B flow starts at step S651 where the next address is received. It would be understood by the person of ordinary skill in the art that the flow described in FIGS. 6A and 6B occurs in response to the same next address. In other words, when a next instruction is received at step S602 FIG. 6A describes the sequence of steps carried out corresponding to a lookup in the prediction cache and the further prediction cache, and FIG. 6B describes the sequence of steps carried out corresponding to a lookup in the candidate prediction buffer. Both the lookup in the candidate prediction buffer and the prediction caches may occur at substantially the same time or at an offset by one or more cycles. However, both are carried out in response to receiving a next address to be looked up. Once a next address has been received at step S651 flow proceeds to step S652 where a candidate prediction lookup is performed. The candidate prediction lookup is performed regardless as to whether the lookups performed in the prediction cache or the further prediction cache hit or miss. If the candidate prediction lookup misses in the candidate prediction buffer then flow returns to step S651. Alternatively, if the candidate prediction hits in the candidate prediction buffer then flow proceeds to step S653 where a candidate prediction entry is selected for inclusion in a subsequent prediction cache lookup.

Figure 7:
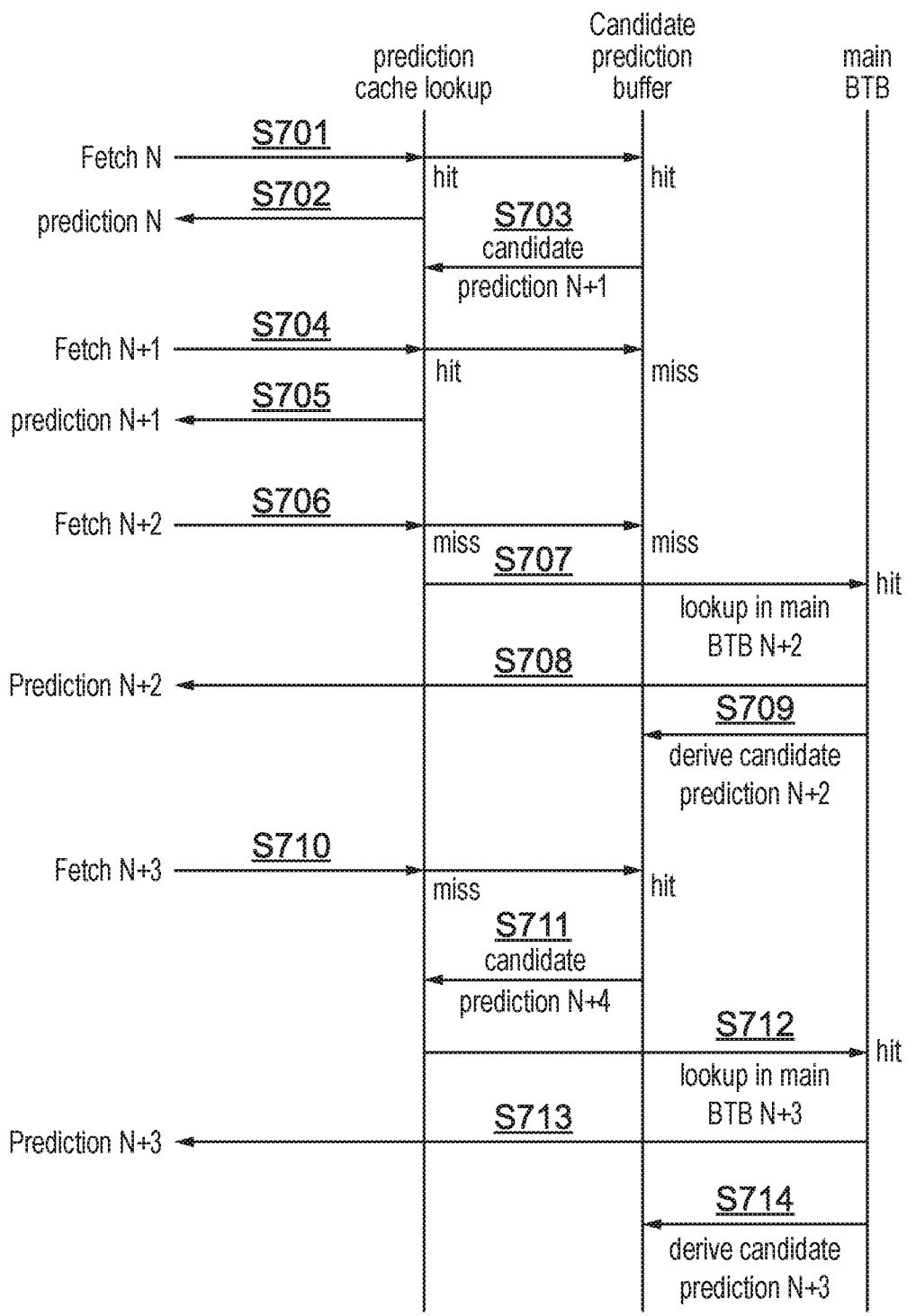
FIG. 7 schematically illustrates a sequence of interactions that are carried out between a prediction cache, a candidate prediction buffer and a main branch target buffer.

FIG. 7 schematically illustrates a sequence of steps that may embody various examples of the present techniques in response to a sequence of fetch addresses. In particular the situation where a number of addresses are fetched in sequence. The addresses which are fetched do not necessarily correspond to blocks of instructions that occur sequentially in program order, rather they correspond to blocks of instructions that are fetched sequentially. At step S701 fetch circuitry 6 indicates a block of instructions to be subsequently fetched (for example after a number of cycles) corresponding to fetch address N. This causes a prediction cache lookup to be performed in the prediction cache including a previously selected entry from the candidate prediction buffer included in the prediction cache lookup and a candidate prediction lookup to be performed in the candidate prediction buffer. In the illustrated embodiment, it is assumed that an entry corresponding to fetch address N is present in both the prediction cache and the candidate prediction buffer such that the prediction cache lookup hits in the prediction cache and the candidate prediction lookup hits in the candidate prediction buffer. As a result, at step S702 a prediction N indicating the prediction used to form the fetch address for cycle N+1 is returned from the prediction cache and at step S703 candidate prediction N+1 is returned from the candidate prediction buffer to be included in a subsequent prediction cache lookup. In particular, candidate prediction N+1 is the candidate prediction that, based on historical data, is likely to correspond to the next fetched address.

At step S704 fetch address N+1 is indicated as the fetch address for the next cycle. This causes a prediction cache lookup to be performed in the prediction cache and a candidate prediction lookup to be performed in the candidate prediction buffer. In the illustrated embodiment candidate prediction N+1 is already present in the prefetched entry 78 for the prediction cache (as it was fetched at step S703). It is assumed for illustrative purposes that there is no entry corresponding to fetch address N+1 in the candidate prediction buffer. Hence, the prediction cache lookup hits and, at step S705 returns prediction N+1, however, as there is no entry corresponding to fetch address N+1 in the candidate prediction buffer the candidate prediction lookup misses. As the prediction cache lookup hit no further steps are taken as a result of the miss in the candidate prediction buffer.

At step S706 fetch address N+2 is indicated as the fetch address for the next cycle. For illustrative purposes it is assumed that there is no entry in either the prediction cache or the candidate prediction buffer that corresponds to fetch address N+1. Hence, both the prediction cache lookup and the candidate prediction lookup miss. In response to the miss in the prediction cache, at step S707, a further lookup is performed in the main BTB corresponding to fetch address N+2. It is assumed, for illustrative purposes, that the main BTB contains an entry that corresponds to fetch address N+2 and, at step S708, a prediction corresponding to fetch address N+2 is returned. In addition, as there was a miss in the prediction cache lookup but a hit in the main BTB, at step S709 a new candidate prediction is derived and the new candidate prediction is allocated to the candidate prediction buffer. The new candidate prediction associates a new candidate lookup address (fetch address N+1 which is latched in latch circuitry 82) with a new candidate prediction entry. The new candidate prediction entry defines a new candidate prediction cache lookup address (fetch address N+2) and a new candidate predicted behaviour (fetch address N+3) (as obtained from the hit entry in the main BTB). However, if no entry was present then the main BTB would predict that the next block of instructions is the block of instructions that occurs next in program order and no new candidate prediction would be derived.

At step S710 fetch address N+3 is indicated as the fetch address for the next cycle. For illustrative purpose it is assumed that the prediction cache lookup misses as neither the prediction cache nor the previously selected candidate prediction entry included in the prediction cache lookup contains an entry corresponding to fetch address N+3. However, the candidate prediction buffer does contain an entry corresponding to fetch address N+3. As a result the candidate prediction lookup hits and at step S711 candidate prediction N+4 is returned from the candidate prediction buffer to be included in a subsequent prediction cache lookup. In particular, candidate prediction N+4 is the candidate prediction that, based on historical data, is likely to correspond to the next fetched address (and predicts the transition from N+4 to a subsequent address N+5). However, in response to the miss in the prediction cache lookup at step S712 a lookup in the main BTB is performed based on fetch address N+3. It is assumed, for illustrative purpose, that the main BTB contains an entry that corresponds to fetch address N+3 and, at step S713, a prediction corresponding to fetch address N+3 is returned. However, if no entry was present then the main BTB would predict that the next block of instructions is the block of instructions that occurs next in program order. Finally, at step S714 a new candidate prediction is derived in response to the miss in both the prediction cache and the previously selected candidate prediction entry that was included in the prediction cache lookup, and the hit in the main BTB. The newly derived candidate prediction defines a new candidate lookup address (fetch address N+2) which is latched in latch circuitry 82 with a new candidate prediction entry. The new candidate prediction entry defines a new candidate prediction cache lookup address (fetch address N+3) and a new candidate predicted behaviour (fetch address N+4). However, if no entry was present then the main BTB would predict that the next block of instructions is the block of instructions that occurs next in program order and no new candidate prediction would be derived.

Figure 8:
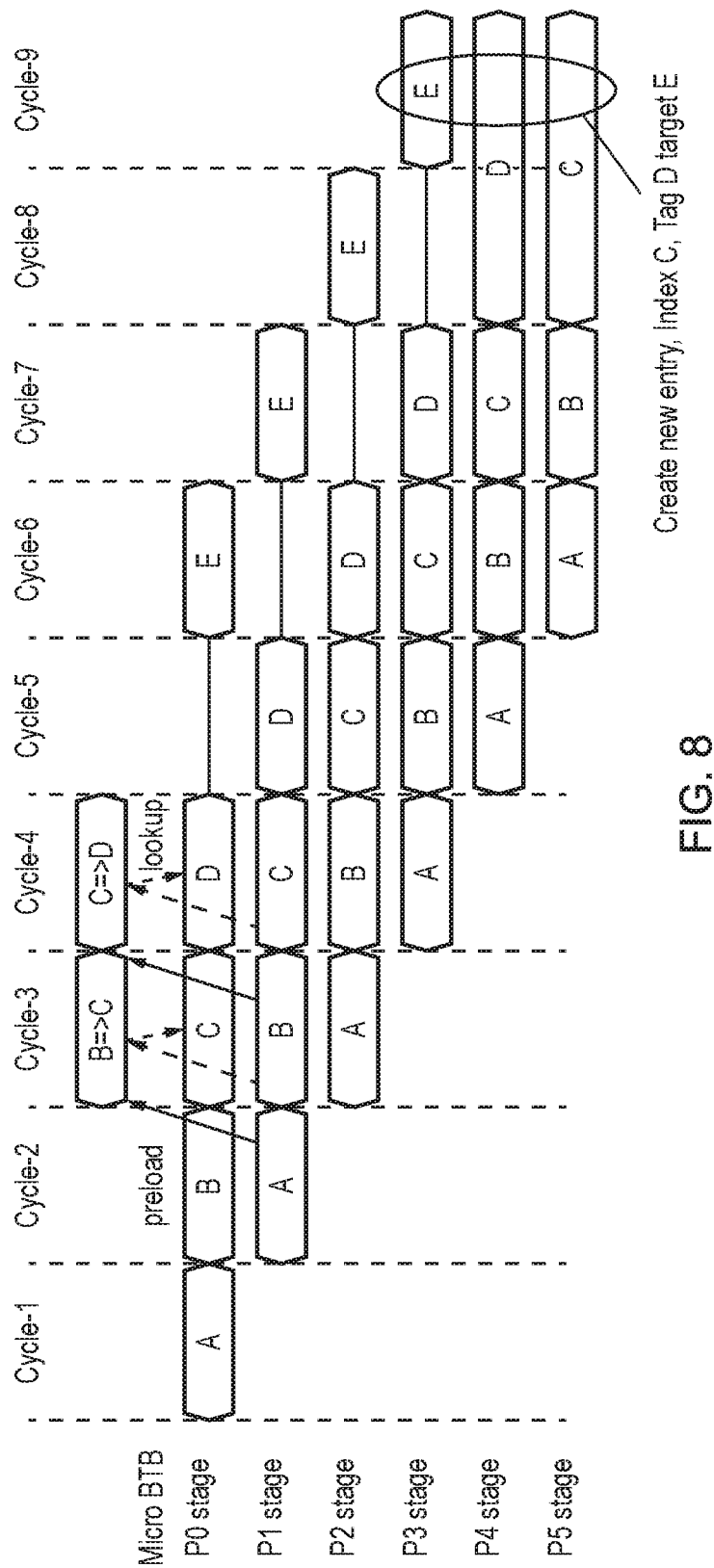
FIG. 8 schematically illustrates details of cycle timing.

FIG. 8 illustrates a sequence of steps that may embody various examples of the present techniques. In particular, FIG. 8 illustrates a method by which a candidate prediction can be determined based on a sequence of in in flight instructions in a pipeline. The flow of instructions A-E are illustrated progressing through pipeline stages P0 to P5 over a number of instruction cycles. On cycle 1 instruction A enters stage P0 of the processing pipeline, P0 indicates the address predicted as the next fetch address based on the address in P1. Over subsequent cycles instruction A progresses through each pipeline stage one cycle at a time. In cycle 2 instruction B enters pipeline stage P0 and at pipeline stage P1 a candidate prediction lookup is performed based on the address of instruction A. In addition a prediction cache lookup is also performed based on the address of instruction A to generate the predicted address B to go in P1 for the subsequent cycle. As indicated the candidate prediction lookup hits in the candidate prediction buffer and, at cycle 3, an entry has been preloaded into the prediction cache (which in this illustrated embodiments takes the form of a micro BTB). AS a result, when a lookup in the micro BTB is performed based on address B in cycle 3, the prediction entry is already loaded into the nano BTB the prediction circuitry predicts that the next block of instructions to be loaded is block C. This process is repeated over cycle 3 and cycle 4 to predict that block of instructions D is to be loaded subsequent to block C. However, no candidate prediction entry is loaded into the micro BTB at cycle 4. Hence, a lookup performed in the micro-BTB at cycle 5 will miss for address D. As a result a lookup is performed in the main BTB and at cycle 6 it is determined that instruction block E is the next block of instructions. Instruction blocks A-E progress through the pipeline stages and, in cycle 9 a new prediction is derived based on the instruction addresses C, D and E that are present in the pipeline at stages P3, P4, and P5.

Figure 9:
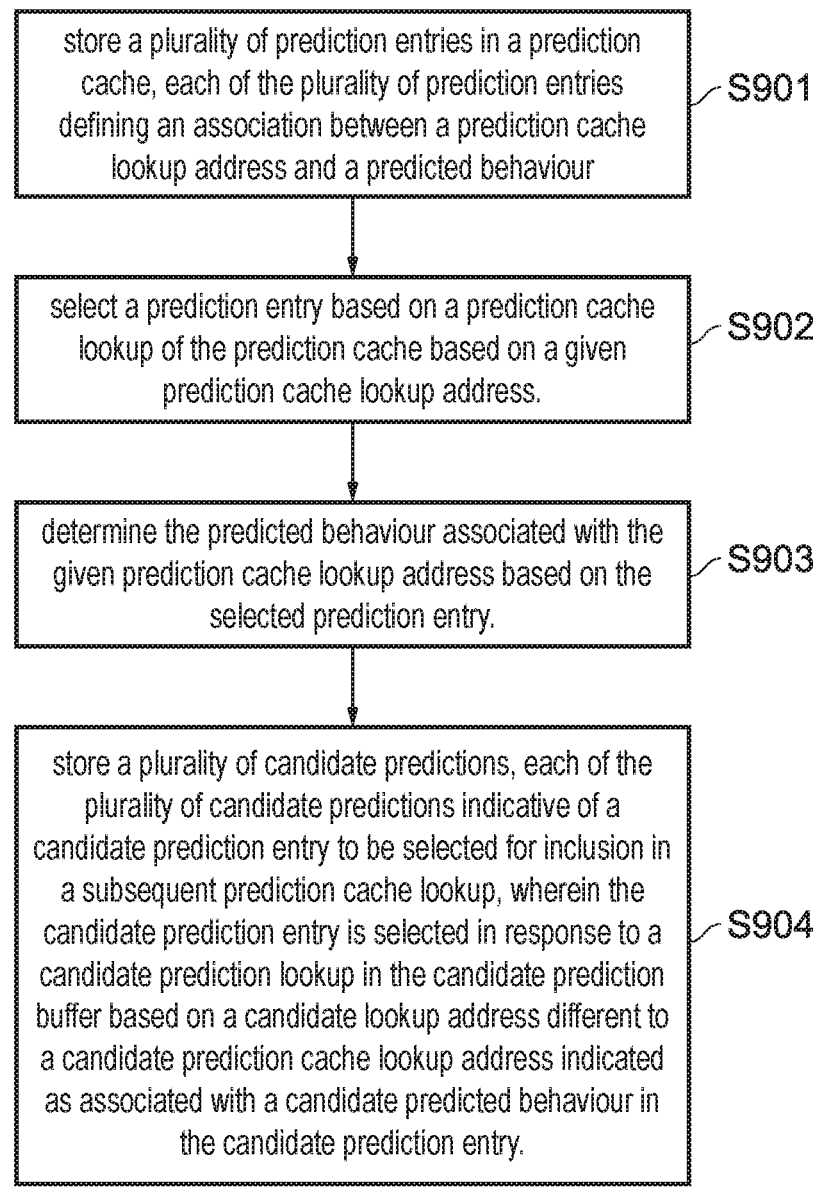
FIG. 9 schematically illustrates a sequence of steps carried out by the data processing apparatus.

FIG. 9 illustrates a sequence of steps that may embody various examples of the present techniques. At step S901 a plurality of prediction entries is stored in a prediction cache, each of the plurality of prediction entries defining an association between a prediction cache lookup address and a predicted behaviour. At step S902 a prediction entry is selected based on a prediction cache lookup of the prediction cache based on a given prediction cache lookup address. At step S903 the predicted behaviour associated with the given prediction cache lookup address is determined based on the selected prediction entry. At step S904 a plurality of candidate predictions are stored, each of the plurality of candidate predictions indicative of a candidate prediction entry to be selected for inclusion in a subsequent prediction cache lookup, wherein the candidate prediction entry is selected in response to a candidate prediction lookup in the candidate prediction buffer based on a candidate lookup address different to a candidate prediction cache lookup address indicated as associated with a candidate predicted behaviour in the candidate prediction entry In brief overall summary a data processing apparatus and a method are disclosed. The data processing apparatus comprising: a prediction cache to store a plurality of prediction entries, each of the plurality of prediction entries defining an association between a prediction cache lookup address and a predicted behaviour; prediction circuitry to select a prediction entry based on a prediction cache lookup of the prediction cache based on a given prediction cache lookup address and to determine the predicted behaviour associated with the given prediction cache lookup address based on the selected prediction entry; and a candidate prediction buffer to store a plurality of candidate predictions, each of the plurality of candidate predictions indicative of a candidate prediction entry to be selected for inclusion in a subsequent prediction cache lookup, wherein the candidate prediction entry is selected in response to a candidate prediction lookup in the candidate prediction buffer based on a candidate lookup address different to a candidate prediction cache lookup address indicated as associated with a candidate predicted behaviour in the candidate prediction entry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A data processing apparatus comprising:
   a prediction cache to store a plurality of prediction entries, each of the plurality of prediction entries defining an association between a prediction cache lookup address and a predicted behaviour;
   prediction circuitry to select a prediction entry based on a prediction cache lookup of the prediction cache based on a given prediction cache lookup address and to determine the predicted behaviour associated with the given prediction cache lookup address based on the selected prediction entry; and
   a candidate prediction buffer to store a plurality of entries, a given entry comprising information indicative of a candidate lookup address, information indicative of a candidate prediction cache lookup address, and information indicative of a candidate predicted behaviour, the candidate prediction cache lookup address and the candidate predicted behaviour being indicative of a candidate prediction entry to be selected for inclusion in a subsequent prediction cache lookup, wherein a first entry comprises a first candidate prediction entry associating a first candidate prediction cache lookup address and a first candidate predicted behaviour, and the first candidate prediction entry is selected in response to a candidate prediction lookup in the candidate prediction buffer based on a comparison with information indicative of a first candidate lookup address in the first entry, wherein the first candidate lookup address is different from the first candidate prediction cache lookup address indicated as associated with the first candidate predicted behaviour in the first candidate prediction entry.

2. The data processing apparatus of claim 1, wherein the prediction cache is capable of processing successive prediction cache lookups with a single cycle delay between a first prediction cache lookup based on a first given prediction cache lookup address and a second prediction cache lookup based on a second given prediction cache lookup address.

3. The data processing apparatus of claim 1, wherein the prediction cache is a branch target buffer and each of the plurality of prediction entries comprises information defining a branch target address prediction.

4. The data processing apparatus of claim 3, wherein the prediction cache is a micro branch target buffer and the apparatus comprises a main branch target buffer, wherein the micro branch target buffer comprises fewer entries than the main branch target buffer, and wherein the data processing apparatus is configured to perform a lookup in the main branch target buffer in response to a miss occurring in the micro branch target buffer.

5. The data processing apparatus of claim 1, wherein when the candidate prediction lookup of the candidate prediction buffer is enabled, the data processing apparatus is configured to perform the candidate prediction buffer lookup based on the first candidate lookup address independent of whether the first candidate prediction cache lookup address hits or misses in the prediction cache.

6. The data processing apparatus of claim 1, wherein the data processing apparatus is configured to derive, in response to a miss in both the prediction cache and a previously selected candidate prediction entry included in the prediction cache lookup, a new candidate prediction and to store the new candidate prediction in the candidate prediction buffer.

7. The data processing apparatus of claim 6, wherein the new candidate prediction comprises, as the candidate lookup address, an address predicted to be encountered at least one cycle earlier than the candidate prediction cache lookup address in a sequence of instruction addresses.

8. The data processing apparatus of claim 1, wherein the prediction circuitry is configured to perform both the prediction cache lookup and the candidate prediction lookup based on a same address as the given prediction cache lookup address and the first candidate lookup address.

9. The data processing apparatus of claim 1, comprising prediction cache allocation circuitry to allocate, to the prediction cache, the first candidate prediction entry selected for inclusion in the subsequent prediction cache lookup.

10. The data processing apparatus of claim 1, wherein the prediction cache is one of a set-associative cache or a direct mapped cache with associativity N>1, wherein the data processing apparatus comprises indexing circuitry to generate a prediction cache index based on a prediction cache indexing scheme, and wherein the candidate prediction buffer has associativity M>N.

11. The data processing apparatus of claim 1, wherein the prediction cache is a fully-associative cache, each of the plurality of entries in the prediction cache comprises a tag based on the prediction cache lookup address of the prediction entry.

12. The data processing apparatus of claim 1, comprising control circuitry configured to disable the candidate prediction lookup when a condition is met.

13. The data processing apparatus of claim 12, wherein the condition is based on a metric indicative of utilisation of the prediction cache.

14. The data processing apparatus of claim 13, wherein the metric indicative of utilisation of the prediction cache is based on at least one of:
   an allocation metric associated with a number of entries allocated to the prediction cache;
   an eviction metric associated with a number of entries evicted from the prediction cache;
   a number of unallocated entries in the prediction cache; and
   a metric indicative of a number of hits in the prediction cache.

15. The data processing apparatus of claim 12, wherein the condition is based on a metric indicative of a state of a processing pipeline of the data processing apparatus.

16. The data processing apparatus of claim 15, wherein the metric indicative of the state of the processing pipeline is based on at least one of:
   a queue occupancy; and
   a stall in the processing pipeline.

17. The data processing apparatus of claim 1, wherein the data processing apparatus is configured, in response to a determination that the first candidate prediction entry is already present in the prediction cache, to discard the first candidate prediction entry in the subsequent prediction cache lookup.

18. The data processing apparatus of claim 1, comprising recovery circuitry to, in response to detecting a misprediction based on the predicted behaviour, perform a recovery action.

19. A method comprising:
   storing a plurality of prediction entries in a prediction cache, each of the plurality of prediction entries defining an association between a prediction cache lookup address and a predicted behaviour;
   selecting a prediction entry based on a prediction cache lookup of the prediction cache based on a given prediction cache lookup address;
   determining the predicted behaviour associated with the given prediction cache lookup address based on the selected prediction entry; and
   storing a plurality of entries, a given entry comprising information indicative of a candidate lookup address, information indicative of a candidate prediction cache lookup address and information indicative of a candidate predicted behaviour, the candidate prediction cache lookup address and the candidate predicted behaviour being indicative of a candidate prediction entry to be selected for inclusion in a subsequent prediction cache lookup, wherein a first entry comprises a first candidate prediction entry associating a first candidate prediction cache lookup address and a first candidate predicted behaviour, and the first candidate prediction entry is selected in response to a candidate prediction lookup in a candidate prediction buffer based on a comparison with information indicative of a first candidate lookup address in the first entry, wherein the first candidate lookup address is different from the first candidate prediction cache lookup address indicated as associated with the first candidate predicted behaviour in the first candidate prediction entry.

20. A data processing apparatus comprising:

means for storing a plurality of prediction entries in a prediction cache, each of the plurality of prediction entries defining an association between a prediction cache lookup address and a predicted behaviour;

means for selecting a prediction entry based on a prediction cache lookup of the prediction cache based on a given prediction cache lookup address;

means for determining the predicted behaviour associated with the given prediction cache lookup address based on the selected prediction entry; and means for storing a plurality of entries, a given entry comprising information indicative of a candidate lookup address, information indicative of a candidate prediction cache lookup address, and information indicative of a candidate predicted behaviour, the candidate prediction cache lookup address and the candidate predicted behaviour being indicative of a candidate prediction entry to be selected for inclusion in a subsequent prediction cache lookup, wherein a first entry comprises a first candidate prediction entry associating a first candidate prediction cache lookup address and a first candidate predicted behaviour, and the first candidate prediction entry is selected in response to a candidate prediction lookup in the means for storing a plurality of candidate predictions based on a comparison with information indicative of a first candidate lookup address in the first entry, wherein the first candidate lookup address is different from the first candidate prediction cache lookup address indicated as associated with the first candidate predicted behaviour in the first candidate prediction entry.

* * * * *